United States Patent [19]
Boothman et al.

[11] 4,052,744
[45] Oct. 4, 1977

[54] TEMPERATURE MONITORING OF SEMICONDUCTORS

[75] Inventors: David R. Boothman, Ennismore; Everett C. Elgar, Peterborough, both of Canada

[73] Assignee: Canadian General Electric Co., Ltd., Toronto, Canada

[21] Appl. No.: 635,141

[22] Filed: Nov. 25, 1975

[30] Foreign Application Priority Data

Dec. 2, 1974 Canada .................................. 215024

[51] Int. Cl.² ............................................. H02H 7/20
[52] U.S. Cl. ...................................... 361/103; 361/98
[58] Field of Search ..................... 317/40 R, 41, 33 R, 317/33 SC, 36 TD, 27 R, 13 B, 13 R, 38; 328/142, 144, 145; 307/229; 361/103, 106, 93, 96, 97–99

[56] References Cited
U.S. PATENT DOCUMENTS

| | | | |
|---|---|---|---|
| 3,319,127 | 5/1967 | Zocholl et al. | 317/36 TD |
| 3,327,171 | 6/1967 | Lipnitz et al. | 317/36 TD |
| 3,436,559 | 4/1969 | Wajs | 328/142 X |
| 3,531,689 | 9/1970 | Horn | 317/33 R X |
| 3,550,020 | 12/1970 | Gill et al. | 328/142 |
| 3,622,770 | 11/1971 | Edelson | 307/229 X |
| 3,622,849 | 11/1971 | Kelly, Jr. et al. | 317/33 SC |
| 3,736,515 | 5/1973 | Kadron et al. | 328/143 |
| 3,757,234 | 9/1973 | Ohlson | 328/142 |
| 3,808,503 | 4/1974 | Hentschel | 317/27 R X |
| 3,849,706 | 11/1974 | Johnson et al. | 317/36 TD X |

Primary Examiner—J D Miller
Assistant Examiner—Patrick R. Salce
Attorney, Agent, or Firm—Arnold E. Renner; Philip L. Schlamp

[57] ABSTRACT

A circuit for monitoring semiconductor junction temperature includes means for obtaining a signal representing the current flowing through the semiconductor, a current controller, an electrical analog of the thermal system of the semiconductor, a direct current supply, and a voltage level detector. The current controller is connected in circuit with the analog and the combination to the d.c. supply. The current conducted by the controller via the analog is controlled by the signal such that the voltage across the analog indicates junction temperature and this voltage is monitored by means of the level detector.

11 Claims, 4 Drawing Figures

TEMPERATURE MONITORING OF SEMICONDUCTORS

BACKGROUND OF THE INVENTION

This invention relates generally to means for monitoring temperatures of semiconductors, and more particularly to the monitoring of junction temperatures of power semiconductors subject to high currents.

The use of solid state semiconductor devices such as diodes and thyristors is now well known in electric power applications. It is also well known that much of the heat generated in a power semiconductor originates at its current carrying junction or junctions. As a result, the junction attains the highest temperature in the semiconductor and is the point at which semiconductor failure usually occurs, should the temperature become excessive. The term "junction" is used in this specification in its broadest sense. Semiconductors often vary in the number of individual junctions that carry current from anode to cathode. For example, a diode may have a single junction while a thyristor will normally have a number of junctions. In this specification, including the claims, the use of the term "junction" is intended to embrace both single and multiple junction semiconductors.

Junction temperature determination cannot be accomplished with a satisfactory degree of accuracy by measuring the temperature of the structure employed to remove heat from the semiconductor element. Owing to the slow thermal transfer characteristics of these structures, external temperature measurements do not accurately reflect junction temperature. In applications of power semiconductors, it is impractical to measure junction temperature directly; as a result, the protective devices used have taken an indirect approach. The oldest and best known of such protective devices is, of course, the fuse, the particular fuse used being designed to blow at a current value considered safe for the semiconductor. This is a somewhat "rough and ready" approach, an approach which tends not to utilize the full current carrying capabilities of the semiconductor and one which is not normally fast enough to protect the semiconductor against all transient conditions. Moreover, fuses introduce the problem of matching the thermal characteristics of the fuse to the semiconductor being used.

Solid state electronic circuits are also known for protecting power semiconductors against overtemperatures. As would be expected, these circuits can be made more sensitive and faster acting than fuses. A circuit of this nature is disclosed in U.S. Pat. No. 3,622,849, "Thyristor Junction Temperature Monitor", issued Nov. 23, 1971, to F. W. Kelley and F. L. Steen. This patent discloses a circuit which combines a signal representing the temperature of the heat dissipating structure of the semiconductor with a signal representing the current flowing in the semiconductor to arrive at a third signal representing the temperature of the junction of the semiconductor. It is summarized in the patent in the following words:

A temperature monitor is provided for determining if the junction temperature of a conducting thyristor has reached a preselected level corresponding to a dangerously elevated junction temperature. The monitor comprises circuitry which synthesizes the thermal response of a portion of the thyristor and the associated pressure assembly between the interior PN-junction of the thyristor and an external reference point on the heat sink closely adjacent the junction. The synthesizing circuitry utilizes a measured signal indicative of the current level flowing through the junction and converts this signal to a signal indicative of the power dissipated in the junction. The latter signal is supplied to a thermal transfer simulator where it is converted into a signal indicative of the temperature difference between the junction and the heat sink reference point. This signal is combined in an adder circuit with a measured signal indicative of the heat sink temperature to provide an output signal indicative of the junction temperature per se. The output of the adder circuit is preferably supplied to a lever detecter for providing a stop signal when its input is above a preselected level. Means responsive to the stop signal may then be used to suppress the gate signals to the conducting thyristor so that it turns off and cools down.

SUMMARY OF THE INVENTION

It is, therefore, an object of the present invention to provide an improved circuit for the monitoring of semiconductor junction temperatures.

It is another object to provide an improved means for monitoring a semiconductor junction temperature through the use of an analog of the semiconductor's thermal system.

It is a further object to provide an improved circuit for the monitoring of semiconductor junction temperatures which circuit provides an output which may be utilized for information purposes or for purposes of providing a corrective action as desired.

The foregoing and other objects are satisfied in accordance with the present invention through the provision of a means to produce a signal having a value which is a function of the current being conducted by the semiconductor. An analog of the thermal system of the semiconductor is connected in circuit with a controller for controlling the current through the analog and a source of current whereby the control of the controller is such that the relation of signal value to analog current approximates the power dissipation characteristic of the semiconductor junction. Further means responsive to a voltage of the analog representative of junction temperature may provide an output signal which may be utilized for information or control purposes as desired.

By way of further explanation, the voltage representative of junction temperature takes into account the power dissipation in the junction, the rate of heat diffusion, and the temperature conditions of the semiconductor structure. The rate at which the heat diffuses from the junction is a function of the transient thermal impedance of this structure. By semiconductor structure is meant the semiconductor cell in combination with the heat dissipating structure for the cell; e.g., a cell mounted on a heat sink. Transient thermal impedance is the ratio of the temperature rise of the junction above the temperature of the heat dissipating structure; i.e., the heat sink, expressed as a function of the time to the power dissipated in the junction. It is a function of several factors, among which are: (1) the size of the heat sink on which the semiconductor is mounted; (2) the nature and velocity of the cooling fluid in heat exchange relation with the heat sink; and (3) the heat dissipating capabilities of the heat sink. If the power dissipation in the junction is known, the temperature of the junction can be determined provided the transient thermal impedance is also known. Transient thermal impedance of a semiconductor structure and the power dissipation characteristic of the junction are both properties of the structure. In the case of a cell, these characteristics are usually supplied by the manufacturer of the cell, and in the case of a cell in combination with its heat sink, these characteristics are obtained by measurement by the party mounting the cell on the sink.

BRIEF DESCRIPTION OF THE DRAWING

While the present invention is particularly defined in the claims annexed to and forming a part of this specification, a better understanding may be had from the following description taken in conjunction with the accompanying drawing, in which:

DETAILED DESCRIPTION

Figure 1:
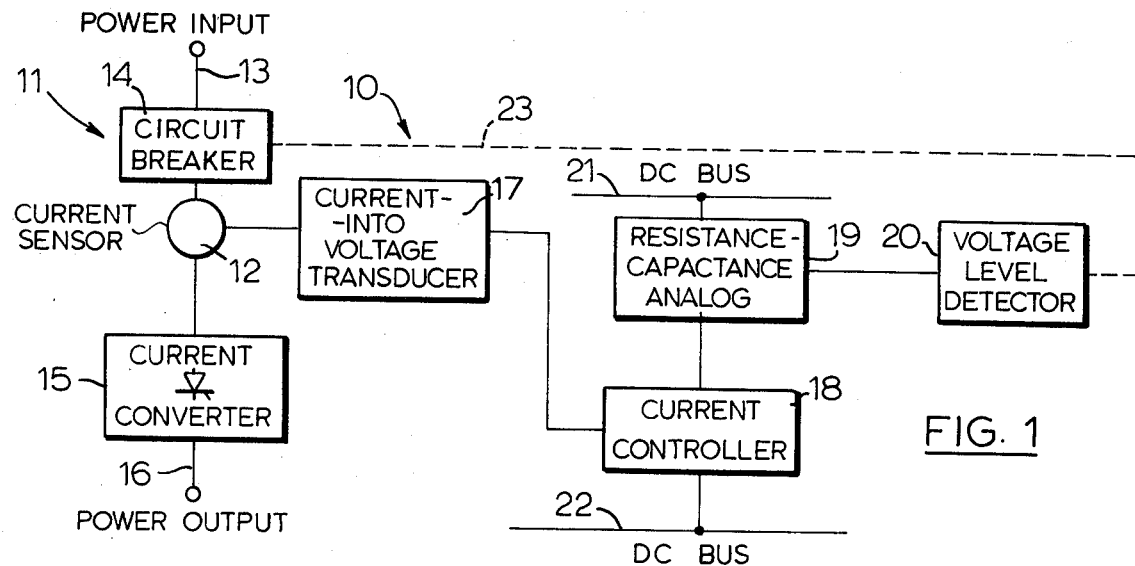
FIG. 1 is a block diagram illustrating the present invention.

Referencing now FIG. 1 there is shown, at 10 and in block form, the temperature monitoring circuit of the present invention coupled with an exemplary current converting circuit 11 by way of a current sensor 12. Circuit 11 consists, essentially, of power input line 13, a circuit breaker 14, a current converter 15 and power output line 16. This power circuit may be used for various purposes, for example, converting polyphase a.c. from line 13 into d.c. on line 16, converting polyphase a.c. from line 13 into polyphase of another frequency on line 16, converting d.c. from line 13 into a.c. on line 16, or the current converter may be in a configuration useful as a circuit interrupter. The converter 15 may contain a number of semiconductors such as thyristors or diodes connected in series-parallel arrays, in bridge or other configurations according to voltage and current requirements. High power converters where semiconductor protection is needed most usually contain a very large number of semiconductors.

Temperature monitoring circuit 10 consists, essentially, of a current-into-voltage transducer 17, a current controller 18, a resistance-capacitance analog 19, a voltage level detector 20, and a d.c. source illustrated by buses 21 and 22. Transducer 17 receives its input signal from sensor 12 and puts out a signal for controller 18. Controller 18 and analog 19 are interconnected between buses 21 and 22, and level detector 20 is connected to analog 19. The level detector may also be operatively linked with the circuit breaker 14 as indicated by broken line 23.

Sensor 12 senses the current flowing in the junctions of the semiconductors in converter 15, and transducer 17 converts the sensor output into a d.c. voltage that is a function of that current. Since the semiconductors in the converter are normally alike, or an nearly alike as possible, and are connected in a circuit configuration that provides current sharing between them, this voltage is, therefore, a function of the current in any one of the semiconductors. Hence, the signal applied to controller 18 for control thereof is a voltage representing the current flowing in the junction of a semiconductor.

In response to this voltage, the controller 18 causes current to flow between buses 21 and 22 via it and analog 19.

Analog 19 is a resistance-capacitance network constructed to simulate the thermal circuit of the semiconductor used in the converter 15. The voltage from transducer 17 exercises control over the current conducted by controller 18. This control of the controller is such that a graph plotted with controller current and transducer voltage as coordinates produces a curve that approximates the power dissipation characteristic of the semiconductor junction. In view of this, the circuit parameters can be selected for a voltage on analog 19 representing junction temperature. This voltage is measured by means of detector 20, and may be displayed in terms of temperature or used for some other purpose such as initiating a control function upon the junction temperature becoming excessive; e.g., tripping circuit breaker 14 as illustrated by the broken line 23. In the circuit shown in FIG. 1, the current controller may be connected to the analog either as a current source or a current sink, the difference being the direction that the current flows in the controller. For purposes of definition, the current flow into the sink and out of the source.

A preferred embodiment of the invention will now be described with reference to FIG. 2 wherein the temperature monitoring circuit is shown in more detail and wherein the operating mode is that of a current sink. The circuit of FIG. 2 has an input section 24, an input buffer 25, a current controller 26, an analog circuit 27, an output buffer 28, a voltage level detector 29, and a pair of d.c. buses 30 (common) and 31 (negative).

Included within the input section 24 are a pair of input terminals 33 and 34 connected to a voltage divider consisting of resistors 35, 36 and 37 in series. A zener diode 38 is connected across resistors 36 and 37 at buffer 25. One side of the divider is connected to the negative bus 31.

The positive output of the voltage divider is fed via an operational amplifier 39 of buffer 25 to the direct or normal inputs of three operational amplifiers 40, 41 and 42 in current controller 26. Amplifier 40 has its output connected to the base of an NPN transistor 43, and that transistor has its collector-emitter in series with two resistors 44 and 45 with the series circuit being connected between a bus 46 and the negative bus 31. Amplifier 40 has its inverting input connected directly to the emitter of transistor 43. Amplifier 41 has its output connected to the base of transistor 47 which has its collector-emitter in series with two resistors 48 and 49 and this combination is also connected across buses 46 and 31. The inverting input of amplifier 41 is connected to the emitter of transistor 47 by way of a resistor 50, is connected to bus 30 by way of resistors 51, 52 and is connected to bus 31 by way of resistors 51 and 53. Amplifier 42 is connected into the circuit in a way very similar as is amplifier 41. That is, amplifier 42 has its output connected to the base of a transistor 54 which has its collector-emitter in series with a pair of resistors 55 and 56 and this series combination is connected between buses 46 and 31. The emitter of transistor 54 is connected by way of a resistor 57 to the inverting input of amplifier 42 which inverting input is further connected to bus 30 by way of a pair of resistors 58 and 59 and to bus 31 by way of resistors 58 and 60.

Block 27 (FIG. 2) is an approximate electrical analog of the thermal system of the semiconductor used in converter 15; i.e., it is a resistance-capacitance network comprised of four capacitors 61 to 64 and four resistors 65 to 68. In the equivalent electrical circuit, electrical capacitance is analogous to heat capacitance, electrical resistance to thermal resistance, current to rate of heat transfer or generation, and voltage to temperature. Hence, in circuit 27, the electrical representations of the thermal conditions in the semiconductor are as follows:

1. the capacitances of capacitors 61 to 64 are analogous, respectively, to the heat capacitances of the junction, wafer, body, and sink; and,
2. the resistances of resistors 65 to 68 are analogous, respectively, to the thermal resistances of junction to wafer, wafer to body, body to sink, and sink to ambient. It is to be noted that the configuration of capacitors 61 to 64 and resistors 65 to 68 is an electrical circuit that only approximates the thermal system of the semiconductor. This particular circuit contains the minimum number of capacitors and resistors considered necessary for the monitor of the present invention and a closer analogy is possible by increasing the number of capacitors and resistors. The network of capacitors and resistors is connected to buses 30 and 46.

Voltage level detector 29 is connected across capacitor 61 of the analog circuit. This connection is preferably made through a buffer circuit 28 containing an operational amplifier 69 in a circuit mode that enables the detector to monitor capacitor voltage without drawing significant current from it. The voltage level detector may be any of those well known in the art which operates to apply a signal to its output terminal in response to a comparison of a varying input to a fixed or reference input. The inputs may be, for example, voltage levels. In one of its simpler forms, detector 29 may be an operational amplifier level detector which outputs a signal when the varying input exceeds the reference input. As illustrated in FIG. 1, this output could be utilized to operate the circuit breaker 14. Other applications such as display, recording, etc., would require other detector forms, such as differential amplifiers.

Figure 2:
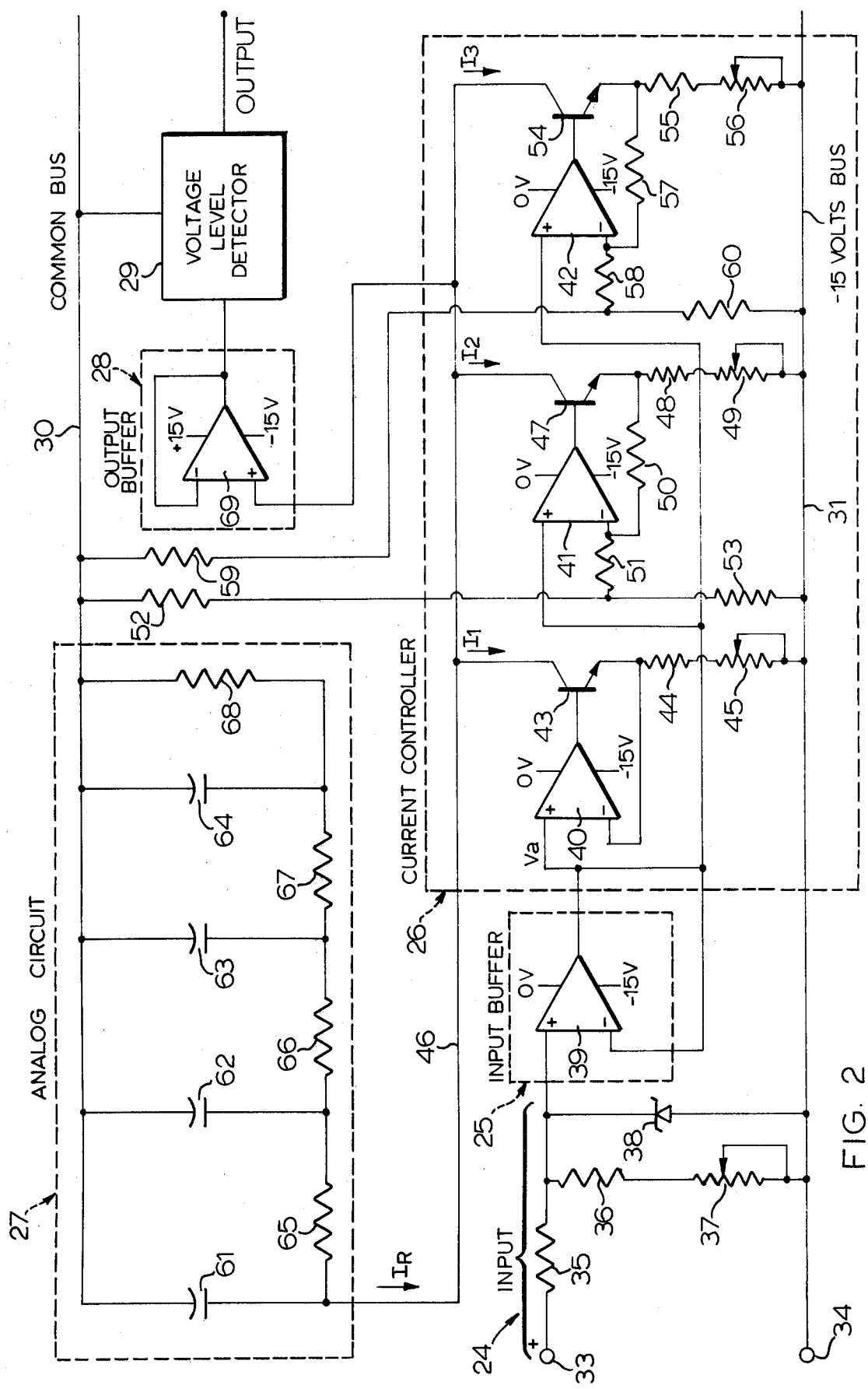
FIG. 2 is a circuit diagram of the preferred embodiment of the temperature monitoring circuit of the present invention.

The power supply for the particular temperature monitoring circuit shown in FIG. 2 is preferably a dual voltage d.c. supply; i.e., a supply having a positive voltage bus, a negative voltage bus, and a zero volts or common bus. As an example and as illustrated in FIG. 2, the positive and negative buses may be at +15 and −15 volts, respectively. Preferably, this power supply will be an inhibited type such as that disclosed in U.S. Pat. No. 3,866,094, "Inhibited Power Supplies" by D. R. Boothman et al., issued Feb. 11, 1975. As previously mentioned, the level detector 29 may operate by comparing a varying voltage level with a fixed voltage level. Since the fixed voltage, in the illustrated embodiment, is obtained from the power supply, transients therein can lead to spurious detector operation if the power supply does not include means for inhibiting such transients.

Figure 3:
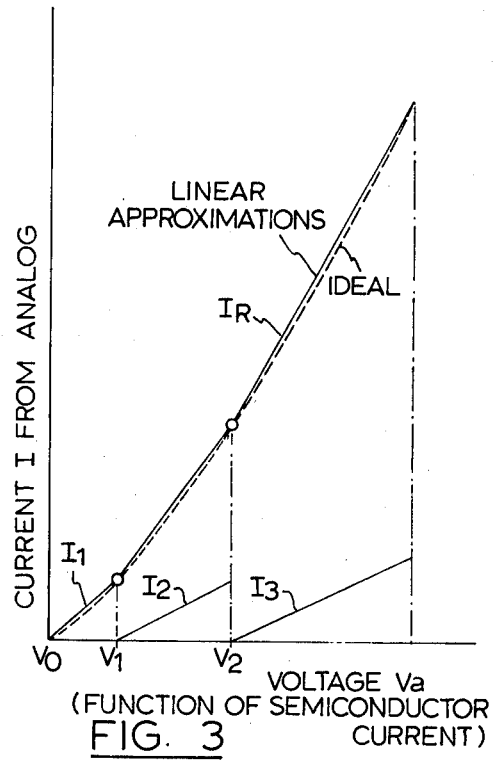
FIG. 3 is a graph related to the operation of the circuit shown in FIG. 2.

The operation of the circuit shown in FIG. 2 is best understood when taken in conjunction with the graph of FIG. 3. The voltage at terminals 33 and 34 of input 24 is a voltage obtained from a current-into-voltage transducer operatively linked with current converter 15 (FIG. 1), and represents the current flowing in a semiconductor of the converter. Stated otherwise, this is a d.c. voltage which is a function of junction current. This voltage is applied to the voltage divider comprising resistors 35, 36 and 37. Resistor 37 is preferably made adjustable so that the signal applied to current controller 26 is within the desired range. Zener diode 38 is provided to protect the operational amplifiers against excessive voltage, transient spikes, etc.

The positive voltage selected at the intermediate point of the divider (junction of resistors 35 and 36) is applied via buffer 25 to the normal inputs of operational amplifiers 40, 41 and 42. Operational amplifier 39 of the buffer converts a high input impedance into a low output impedance. Although the buffer is not essential to the operation of the circuit, its presence is very useful in that it isolates the divider from the current controller in the sense that the controller does not disturb the divider current balance; i.e., the proportionality of divider voltage to junction current is not disturbed by current taken by the controller. Hence the voltage $V_a$ applied to the normal inputs of operational amplifiers 40 to 42 is a function of junction current.

The positive voltage put out by operational amplifier 40 is applied to the base of transistor 43, causing the transistor to conduct a current $I_1$ from bus 46 to bus 31 by way of its collector-emitter and resistors 44, 45. Control of the amplifier is effected by the positive voltage $V_a$ applied to its normal input and a positive feedback voltage to its inverting input from the emitter of the transistor. The current $I_1$ conducted by the transistor is determined by the amplifier output and the values of resistors 44 and 45. Hence, a direct relation exists between current $I_1$ and voltage $V_a$. This relation is shown graphically in FIG. 3 where current I is the ordinate and voltage $V_a$ the abscissa. In this graph, current $I_1$ is shown as being linear and beginning at zero volts and current. In practice this current may not always be quite linear, but close enough thereto to be taken as linear for purposes of this discussion.

Amplifier 41, transistor 47, resistors 48 and 49 comprise a circuit like that of components 40, 43, 44 and 45 except for the signal applied to the inverting input of the amplifier 41. In this case, resistor 50 alters the feedback and a negative bias is applied by way of resistors 53, 52 and 51. This bias raises the voltage $V_a$ necessary to turn on the transistor. FIG. 3 shows the current $I_2$ conducted by transistor 47 rising linearly from zero at voltage $V_1$ along a slope differing from the slope of current $I_1$. This slope is determined by the voltage on the base of the transistor and the values of resistors 48 and 49.

Amplifier 42, transistor 54 and resistors 55 to 60 constitute a circuit like that described in the foregoing paragraph. In this case the current $I_3$ conducted by transistor 54 is shown in FIG. 3 rising linearly from zero at voltage $V_2$ along a slope differing from the slopes of the other two currents for the same reasons as were explained in that preceding paragraph.

As shown in FIG. 2, currents $I_1$, $I_2$ and $I_3$ are obtained from a bus 46 which is also connected to analog 27 at capacitor 61. Hence, the sum of these currents can be represented as $I_R$ which current comes from the analog at the junction of capacitor 61 with resistor 65. If in FIG. 3 currents $I_1$, $I_2$ and $I_3$ are summed graphical, as they are algebraically in the circuit of FIG. 2, the sum can be represented by the curve $I_R$. Curve $I_R$ is a series of straight lines appearing as an approximation of the dashed-line curve marked "ideal". The ideal curve represents the power dissipation characteristics of the junction, that is, a graph of the junction current plotted against the watts dissipated in the junction plus the losses due to the resistance of the materials of the semiconductor. Since the controller current is to be analogous to the rate of heat generation, current I in FIG. 3 can be expressed in terms of watts; and, of course, voltage $V_a$ represents junction current. Hence the dashed-line curve shown in this figure is also a representation of the power dissipation characteristic of the junction. This characteristic curve can be obtained from the semiconductor manufacturer or through test. Curve $I_R$ in FIG. 3 can be made to approximate the power dissipation characteristic through the proper selection of components 40 to 45 and 47 to 60. That is, the resistors selected have values and the amplifiers and transistors have operating characteristics which combine in function to produce the flow of currents $I_1$, $I_2$ and $I_3$ which sum up into current $I_R$.

FIG. 2 illustrates a three stage current controller 26, that is, a controller in which the components 40 and 43 to 45 that generate current $I_1$ may be regarded as the first stage, the components 41 and 47 to 53 that generate current $I_2$ the second stage, and the components 42 and 54 to 60 that generate current $I_3$ the third stage. In the preferred embodiment of the invention, the three-stage currents $I_1$, $I_2$ and $I_3$ produce a reasonable approximation $I_R$ of the power dissipation characteristic of the junction. However, there may well be instances where a closer approximation is wanted, in which case a fourth or even more stages may be added. Adding further stages should be within the capabilities of those skilled in the art in the light of this disclosure.

As previously stated, the capacitor-resistor network shown at 27 in FIG. 2 is an approximate electrical analog of the thermal system of the semiconductor. At any given time, the current flowing in capacitor 61 is analogous to the rate of heat generation in the semiconductor junction and the voltage across the capacitor is analogous to the temperature rise of the junction. Components 62 to 68 of the network represent the semiconductor structure by means of which heat is removed from the junction. Since the power dissipation characteristic of the junction is, in effect, an expression of junction heating and current $I_R$ is an approximation of this characteristic, it follows, therefore, that in an analog such as 27 the voltage across capacitor 61 represents junction temperature.

The voltage across capacitor 61 is monitored by means of the voltage level detector 29. A buffer 28 in the circuit from bus 46 to the level detector stops the level detector from drawing significant current from the bus. The buffer 28 shown in FIG. 2 is essentially an operational amplifier in a circuit mode that draws negligible current from the bus and yet follows the voltage on the capacitor. Any changes in the value of current $I_R$ are reflected in the voltage across capacitor 61; hence, this current must not be disturbed if the level detector is to give an accurate reading of junction temperature. Detector 29 may be adapted for a number of functions such as displaying junction temperature, recording junction temperature, or shutting down the converter if its semiconductor temperatures become excessive, all depending upon the type of detector employed and the use to which its output is put.

Figure 4:
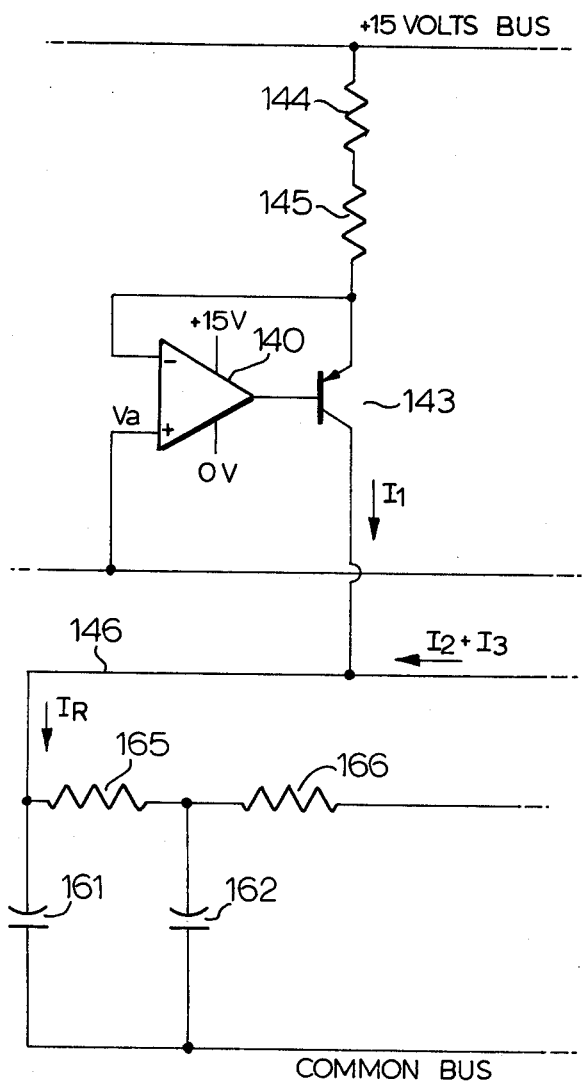
FIG. 4 illustrates a variation of the circuit shown in FIG. 2.

In the FIG. 2 circuit, analog circuit 27 is used with a current controller 26 operated in the mode of what has been defined as a current sink. The temperature monitoring circuit can also use the analog with a controller in the mode of what has been defined as a current source. By this definition, the current may be thought of as flowing out of a source and into a sink. Operating the controller as a current source is illustrated in FIG. 4 and will now be considered. In the case of a current source, many of the components shown in FIG. 2 for controller 26 and analog 27 are arranged as shown in FIG. 4. The components that have been rearranged are identified by the same numbers prefixed by one; e.g., amplifier 40 of FIG. 2 becomes amplifier 140 in FIG. 4, NPN transistor 43 of FIG. 2 becomes PNP transistor 143 in FIG. 4, and so forth. For sake of simplicity and brevity, FIG. 4 illustrates only the circuit components for producing current $I_1$; the components for producing currents $I_2$ and $I_3$ will be arranged in the same way as will be well understood by those skilled in the art. Operation of the temperature monitoring circuit is the same whether the controller to be used in the mode of a current sink or a current source.

In a practical application of the invention for protecting a converter such as that shown at 15 in FIG. 1, one of the monitoring circuits shown in FIG. 2 (or as modified in FIG. 4) will usually do. In arriving at the parameters for the monitor, the worst possible operating conditions will be taken for the semiconductors in the converter, and these conditions may then increase by a margin of safety, say 20%. For example, if the current sharing between the semiconductors in the converter is such that the most that any one of them will carry is 100 amperes, the monitor can be designed as though this were 120 amperes.

While there have been shown and described what are at present considered to be the preferred embodiments of the present invention, modifications thereto will readily occur to those skilled in the art. It is not desired, therefore, that the inventions be limited to the specific arrangements shown and described and it is intended to cover in the appended claims all such modifications as fall within the true spirit and scope of the invention.

What is claimed is:

1. A circuit for monitoring the temperature of a junction of a semiconductor comprising:
   a. means for producing a signal having a value which is a function of the current conducted by the semiconductor;
   b. an electrical circuit analog of the thermal system of the semiconductor, said analog including electrical representations of the heat capacities of a total semiconductor structure including a heat sink and further including electrical representations of the thermal resistances from the junction to ambient;
   c. a current controller in circuit with said analog for controlling the current of said analog, said analog and said controller together comprising an analog-controller circuit;
   d. means for furnishing the current of said analog-controller circuit;
   e. means for applying said signal to said controller for controlling the conduction thereof whereby the control of said controller by said signal is such that the relation of signal value to the analog current magnitude approximates the power dissipation characteristic of the semiconductor junction; and,
   f. means connected to said analog for detecting a voltage thereof representative of junction temperature.

2. The invention in accordance with claim 1 wherein said electrical circuit analog comprises a resistance-capacitance network.

3. The invention in accordance with claim 1 wherein said means for producing a signal produces a voltage signal.

4. The invention in accordance with claim 1 wherein the last mentioned means comprises a voltage level detector responsive to the voltage of said analog to provide an output signal when the voltage of said analog exceeds a predetermined value.

5. A circuit for monitoring the temperature of a junction of a semiconductor device having a junction, a wafer, a body and a heat sink comprising:
   a. means for producing a signal having a value which is a function of the current conducted by the semiconductor device;
   b. an electrical resistance-capacitance analog of the thermal system of the semiconductor device including a first capacitance means representing the heat capacity of the junction of the semiconductive device, additional capacitance means representing the heat capacities of the wafer, body and heat sink and resistance means representing the thermal resistance from the junction to ambient;
   c. a current controller having a plurality of stages, each of said stages being responsive to said signal to control the magnitude of current conducted thereby, each of said stages being connected in parallel and having one side thereof connected to one side of said first capacitance means;
   d. a d.c. current supply having one pole connected to the other side of each of said stages and a second pole connected to the other side of said first capacitance means;
   e. means to apply said signal to each of the stages of said controller whereby the currents collectively conducted by said stages approximate a curve representing the power dissipation characteristics of the junction; and,
   f. means connected to said first capacitance means for measuring a voltage thereof representing the temperature of said junction.

6. The invention in accordance with claim 5 wherein said means for producing a signal produces a voltage signal.

7. The invention in accordance with claim 5 wherein the last mentioned means comprises a voltage level detector responsive to the voltage of the first capacitance means to provide an output signal when said voltage exceeds a predetermined value.

8. The invention in accordance with claim 6 wherein each of said stages includes:
   a. an operational amplifier to one input terminal of which is applied said voltage signal;
   b. a transistor having its base connected to an output of said amplifier and its collector-emitter in series circuit with resistance means between one side of said capacitance means and said one pole of said d.c. current supply; and,
   c. means to provide a feedback signal from the series circuit to a second input terminal of said operational amplifier.

9. The invention in accordance with claim 8 including means whereby the voltage signal is applied to the normal input terminal of the operational amplifier and the feedback signal is a positive voltage signal and is applied to the inverting input of the operational amplifier.

10. The invention in accordance with claim 8 wherein control means are selectively provided to control the value of the feedback signal.

11. The invention in accordance with claim 10 wherein said control means includes a voltage divider network.

* * * * *